United States Patent
Arnau Del Amo et al.

(10) Patent No.: US 10,315,932 B2
(45) Date of Patent: Jun. 11, 2019

(54) DEVICE, APPARATUS AND METHOD FOR DESALINATING SEAWATER

(71) Applicant: CENTRE INTERNACIONAL DE MÈTODES NUMÈRICS EN ENGINYERIA, Barcelona (ES)

(72) Inventors: Pedro Antonio Arnau Del Amo, Vilanova I La Geltrú (ES); Eugenio Oñate Ibáñez De Navarra, Barcelona (ES); Dan Alexandru Hanganu, El Bruc (ES); Naeria Navarro Navarro, Vallvidrera (ES)

(73) Assignee: CENTRE INTERNACIONAL DE MÈTODES NUMÈRICS EN ENGINYERIA, Barcelona (ES)

(*) Notice: Subject to any disclaimer, the term of this patent is extended or adjusted under 35 U.S.C. 154(b) by 548 days.

(21) Appl. No.: 14/894,233

(22) PCT Filed: May 27, 2014

(86) PCT No.: PCT/EP2014/060928
§ 371 (c)(1),
(2) Date: Nov. 25, 2015

(87) PCT Pub. No.: WO2014/191398
PCT Pub. Date: Dec. 4, 2014

(65) Prior Publication Data
US 2016/0122205 A1    May 5, 2016

(30) Foreign Application Priority Data
May 28, 2013 (EP) .................................. 13382196

(51) Int. Cl.
*C02F 1/08* (2006.01)
*B01D 1/22* (2006.01)
(Continued)

(52) U.S. Cl.
CPC .............. *C02F 1/08* (2013.01); *B01D 1/0035* (2013.01); *B01D 1/22* (2013.01); *B01D 1/221* (2013.01);
(Continued)

(58) Field of Classification Search
CPC ........ B01D 1/0035; B01D 1/22; B01D 1/221; B01D 5/0015; B01D 5/006; C02F 1/08; C02F 2103/08
See application file for complete search history.

(56) References Cited

U.S. PATENT DOCUMENTS 3,275,530 A    9/1966 Akers
4,402,793 A *  9/1983 Petrek .................... B01D 1/22
                                                    202/174

(Continued)

FOREIGN PATENT DOCUMENTS

FR    2583738 A1    12/1986
WO    2004110936 A2    12/2004
(Continued)

OTHER PUBLICATIONS

Konstantinova, E.V., et al., The Corrosion-Resistance of Materials in Sea Water, 1965, Proceedings of the First International Symposium on Water Desalination, U.S. Dept. of the Interior, Office of Saline Water, pp. 549-556.*

(Continued)

*Primary Examiner* — Renee Robinson
*Assistant Examiner* — Derek N Mueller
(74) *Attorney, Agent, or Firm* — Peter B. Scull; HDC IP Law LLP

(57) ABSTRACT

A device for desalinating seawater comprises at least three plates (20, 21, 22), at least two evaporation chambers, each of them delimited by two consecutive plates, and entrance means (24) to feed the evaporation chambers with seawater (Continued)

to be desalinated, said entrance means being suitable to feed all the evaporation chambers with seawater from a common source, so that at least one plate is suitable to operate as a condensation surface in one chamber and as an evaporation surface in the next chamber. The device may be arranged in any coastal system that requires a heat flux of low thermal intensity between a hot source (60) and a cold sink (70). The device guarantees said heat flux by means of vapour generation, transportation and condensation, whereby condensed water is collected as a valuable by-product. A method of desalinating seawater comprises the steps of deaerating the seawater to be desalinated and feeding all the evaporation chambers with said deaerated seawater.

10 Claims, 3 Drawing Sheets

(51) Int. Cl.
  *B01D 1/00* (2006.01)
  *B01D 5/00* (2006.01)
  *C02F 103/08* (2006.01)
(52) U.S. Cl.
  CPC .......... *B01D 5/006* (2013.01); *B01D 5/0015* (2013.01); *C02F 2103/08* (2013.01); *Y02A 20/128* (2018.01); *Y02A 20/129* (2018.01); *Y02A 20/212* (2018.01)

(56) References Cited

U.S. PATENT DOCUMENTS

| | | |
|---|---|---|
| 2006/0272933 A1 | 12/2006 | Domen et al. |
| 2009/0077969 A1 | 3/2009 | Prueitt |
| 2013/0175155 A1* | 7/2013 | Lee .......................... B01D 1/04 202/185.1 |

FOREIGN PATENT DOCUMENTS

| | | |
|---|---|---|
| WO | 2010116100 A2 | 10/2010 |
| WO | 2012170900 A1 | 12/2012 |
| WO | 2004110936 A2 | 12/2014 |

OTHER PUBLICATIONS

International Search Report and the Written Opinion of the International Searching Authority for Application No. PCT/EP2014/060928, issued by the European Patent Office dated Nov. 10, 2014, 9 pages, Rijswijk, Netherlands.

\* cited by examiner

DEVICE, APPARATUS AND METHOD FOR DESALINATING SEAWATER

The present invention is related to a device for desalinating seawater that comprises at least three plates, at least two evaporation chambers, each of them delimited by two consecutive plates, and entrance means to feed the evaporation chambers with seawater to be desalinated. The invention is also related to an apparatus and a method for desalinating seawater.

Distillation desalination facilities may comprise an evaporation part where evaporation of seawater takes place at a subatmospheric pressure, in order to facilitate evaporation at ambient temperature, and a condensation part where the vapour condenses into freshwater. Since raw water contains incondensable gases (air), the increasing contamination of the system with incondensable gases would reduce the rate of evaporation and vapour transport and hence lower the energy efficiency of the system. It is thus advised to feed only deaerated seawater to the system.

Efficient desalination systems tend to be associated to power plants that convert ocean thermal energy. US 2009/0077969 discloses an Ocean Thermal Energy Conversion (OTEC) plant upgrade in which "the warm-water discharge from the OTEC plant flows through pipe 30 into and through the warm seawater chamber 31, and some of it flows through water distributor 32 and flows as a water film 33 down the wall of the next chamber 39 to the left. The cold-water discharge from the OTEC plant flows through pipe 36 into and through the cold-water chamber 38 and flows as water films 37 down the right wall of some of the evacuated chambers 39. Heat from the warm seawater evaporates water from the film 33 flowing down the wall next to the warm seawater chamber. That water vapour passes around the baffle 35 and condenses on the left wall of its chamber 39 and passes heat to the flowing water film 37 through the wall. This process continues through each stage until the heat flows into the cold-water chamber 38. Each chamber from right to left is cooler than the chamber to its right" (paragraph 50; FIG. 4).

With the system of US 2009/0077969, the heating agent (hot source) is the same seawater that is fed to the first evaporation chamber, the cooling agent (cold sink) is the same seawater that is fed to the subsequent evaporation chambers, no seawater is pre-deaerated and "by placing a baffle in the middle of the chamber, the entrapped air is carried with the water vapour downward on the left side of the baffle 35 to the bottom of the chamber. The downward flow of the water film 34 also helps to move the air downward. When the air gets to the bottom, it flows out next to the water stream 34. The air is drawn off (along with some water vapour) through pipe 40 to a vacuum pump" (paragraph 51). This way of deaerating the seawater to be, or being, desalinated may turn the system inefficient and prone to malfunctioning, since it lets air into the chambers and the incondensable gases slow down evaporation and vapour diffusion. Besides, there is an associated vapour loss because the air drawn out by the vacuum pump is accompanied by some water vapour, which implies a further decrease of freshwater production efficiency.

It would also be interesting to have a desalination system that is not necessarily associated to a power plant, that is versatile regarding both its size and its applications and that guarantees a sustained low density heat exchange between the heating and cooling agents.

The present disclosure teaches ways to obtain such a system that further overcomes the indicated drawbacks of the prior art.

The present disclosure contemplates a device for desalinating seawater that comprises at least three plates, preferably parallel, at least two evaporation chambers, each of them delimited by two consecutive plates, and entrance means to feed the evaporation chambers with seawater to be desalinated, said entrance means being suitable to feed all the evaporation chambers with seawater from a common source, for example by means of a duct connecting each evaporation chamber to a tank of deaerated seawater, so that at least one plate is suitable to operate as a condensation surface in one chamber and as an evaporation surface in the next chamber (the next chamber being the colder adjacent chamber and the previous chamber being the hotter adjacent chamber). Hence, in operation, one surface of the plate is a condensation surface in one chamber and the other surface of the plate is an evaporation surface in the next chamber.

With this arrangement, the entrance means are simplified and the seawater fed to the evaporation chambers can be pre-deaerated and entered at a suitably controlled pressure and temperature that is the same for all the chambers. A suitable vacuum is created in the chambers prior to operation and will be self-maintained therein when in operation.

The device may be arranged in any coastal system that requires a heat flux of low thermal intensity between a hot agent and a cold agent. In this way, the device guarantees said heat flux by means of vapour generation, transportation and condensation, whereby condensed (desalinated) water is collected as a valuable by-product.

Each evaporation chamber operates at a practically uniform temperature and the pressure in the chamber is practically equal to the vapour pressure of water at said temperature (the pressure is slightly below the vapour pressure but the temperature is below the boiling point, hence the process in the chamber is evaporation, not ebullition). One of the plates is suitable to operate as an evaporation surface and the other plate is suitable to operate as a condensation surface in said evaporation chamber, because one is slightly hotter than the other. Each evaporation chamber is provided with a substantially clear space between said two plates that allow the vapour molecules to follow the shortest path from the evaporation surface to the condensation surface. An individual water vapour molecule can of course follow many different paths, but the point is that it can travel substantially unimpeded, and in average will do so, and almost instantaneously from the evaporation surface to the condensation surface.

The way the device is preferably intended to operate is thus to have the evaporation chambers at a subatmospheric pressure practically equal to the vapour pressure and to form a wet coating of deaerated seawater on the evaporation surface of each evaporation chamber; most of said water is quietly evaporated (the wet coating dries as a moist fabric on a heated radiator) and the vapour travels to the corresponding condensation surface, where it condenses and flows downward to be collected as freshwater.

In some embodiments, the evaporation surface of at least one, but preferably of each, evaporation chamber may be provided with a hydrophilic lining, which facilitates the formation of the wet coating and increases the residence time of water molecules to be evaporated, thus increasing the proportion of evaporated seawater. The journey of the vapour molecules across the evaporation chamber (from the evaporation surface to the condensation surface) is facilitated by the absence of barriers within the chamber.

In some embodiments, the condensation surface of at least one, but preferably of each, evaporation chamber may be provided with a hydrophobic lining, which facilitates condensation by reducing the residence time of already condensed droplets on the condensation surface (and hence not letting them to grow up on it) in order for these droplets not to impair the condensation of new ones.

Since the actual phenomenon is evaporation as opposed to ebullition and the system works in absence of incondensable gases (seawater is pre-deaerated), the evaporation and condensation surfaces of any chamber need not be separated by any large intermediate division, so said two surfaces can be very close to each other, which allows the device to be very compact by reducing the width (and the volume) of each chamber, which furthermore makes it easier and cheaper to set the chambers at a subatmospheric pressure. Besides, the critical path that vapour follows is the shortest possible. This implies there are no changes in the gas flow regime (it doesn't accelerate nor expand), so that almost no difference of temperature across the chamber is required for the heat transfer to occur. The distance between the evaporation and condensation surfaces needs only be just bigger than the size of the condensed droplets, which is given by the characteristics of the hydrophobic lining of the condensation surface.

The number of plates may be higher than 5, perhaps higher than 10 or even higher than 40 or 50, depending on the difference of temperature between the heating and cooling agents, in order to increase the freshwater production. The temperature gradient has to be big enough for heat conduction to take place across a block with a thickness equivalent to the sum of all plates.

The total thermal gradient available for the entire device is spent mostly on overcoming the thermal resistance of the walls between chambers and a negligible part of it inside the chambers themselves. The actual working temperature inside each chamber is determined by the play of various factors such as: available powers of the heat source and the cold sink, available surfaces for thermal interchange, actual thicknesses of the metal plates and thermal conductivity of the material they are made of. These are the aspects which make the system to auto-regulate.

In some embodiments, each evaporation chamber comprises heat conducting means than connects the two plates of the chamber as a passive safety measure. This is advantageous in systems where a low thermal density heat exchange between the heating and cooling agents needs to be guaranteed (e.g. LNG vaporizers or refrigeration systems). The heat conducting means may comprise, for example, some conducting rods arranged between consecutive plates.

It is noted that there are three modes of heat transfer: radiation, conduction and convection; the heat conducting means operates by conduction and thus guarantees a heat exchange between consecutive plates even when no vapour is generated in the corresponding evaporation chamber, thus maintaining the device in service and making it fail-proof. In case vapour is indeed generated, it will act as the preferential heat transmission agent because it transmits heat in a much faster and more efficient manner than conduction is able to, due to its lower thermal impedance. The heat conducting rods may be made of a metal, but heat transmission by vapour travel is a far better way to exchange heat than by conduction in any metal (about 5 MW/m$^2$ versus 0.2 MW/m$^2$ in a standard arrangement).

The device is so designed that in normal operation, i.e. with vapour generation in all the evaporation chambers, the ends of the rods are thermally short-circuited between two consecutive plates by the absence of enough temperature gradient between said plates to overcome the thermal resistance of the rods. This is due to the homogenization of the temperature inside each chamber, which impedes a continued heat flux through the rods.

The heat conducting means thus guarantees a heat exchange between the heating and cooling agents in all cases, even in case there is no seawater supply and therefore no vapour can act as a heat-exchanging agent. In this sense, it allows the apparatus to carry out two functions: a secure and continuous heat exchange between the heating and cooling agents and a freshwater production in the functioning evaporating chambers.

The present disclosure also contemplates that an apparatus suitable for desalinating seawater comprises such a desalinating device and also comprises a means to heat one of the end plates and a means to cool the other end plate, said means including the heating agent and the cooling agent, respectively. Said heating and cooling means can be any suitable hot source and cold sink, respectively; they may be a flow of warm and cold seawater but there are other possibilities. In any case, the heating agent and the cooling agent are independent from each other and from the deaerated seawater that is fed to the evaporation chambers of the device.

The device can be adapted to a wide kind of apparatuses comprising any heating and cooling agents, provided seawater or saline water is at hand.

The apparatus may further comprise a source of deaerated seawater that is connected to the entrance means. In some embodiments, it may comprise a degassing means to previously deaerate the seawater to be desalinated in the desalinating device.

The present disclosure further contemplates the use of said apparatus to desalinate seawater, said desalinating method also comprising the step of previously deaerating the seawater to be desalinated in the desalinating device.

All the evaporation chambers can be fed with said deaerated seawater, with the above-mentioned advantages. Almost all the deaerated seawater can then be evaporated and no vapour is lost by drawing air out of the chambers because practically no air is inserted therein.

The seawater fed to an evaporation chamber to be desalinated therein could nevertheless contain a small amount of dissolved air (for example, in case of malfunctioning deaeration), but even in this case no incondensable gases will build up inside the chamber because the condensed water will dissolve them as it is slightly cooler than the feed seawater (the cooler the water, the bigger the solubility of gases in it). Consequently, the air content in the chambers will in any case be very low and stable.

The seawater to be deaerated, that may be the same for all the chambers, may be taken from superficial sea layers, which can be cheaply pumped.

In some embodiments, at most one of the heating means or the cooling means of the apparatus may involve a flow of seawater, preferably the heating means. Said flow of seawater may be external to the desalinating device and said seawater can thus be different from the seawater to be desalinated, whereby it is not necessary to deaerate it.

The cooling means may use a different cooling agent that, depending on the set-up, might advantageously come handy.

Once vapour has been created in all the evacuated chambers (which are at a subatmospheric pressure), the device can be thermally connected to both the heating and cooling agents and the system then adjusts itself in order to produce a suitable heat flux between said agents. Each chamber spontaneously acquires a certain temperature and (almost)

its corresponding vapour pressure, which decrease in the sense from the heating agent to the cooling agent.

In some embodiments, one surface of any plate (e.g. the condensation surface of the previous chamber) is at a higher temperature than the other surface (e.g. the evaporation surface of the next chamber), the sum of all these temperature differences across the plates approximately being the temperature difference between the heating agent and the cooling agent.

In some embodiments, heat may be conducted from at least one plate to the next plate through the heat conducting means when, for whatever reason, vapour generation stops in the corresponding chamber.

A continuous flow of deaerated seawater is preferably maintained in almost motionless film form on the evaporation surface of each evaporation chamber (it is more like a wet coating on the hot plate of the chamber from where moisture seeps through), in order to provide a good heat transfer between the evaporation surface and the water. In some embodiments, not all the seawater in the coating is evaporated in order to avoid solid depositions, and thus a tiny positive flow of seawater (brine, actually) may be discharged through an exit of at least one evaporation chamber of the desalinating device.

A particular embodiment of the present invention will be described in the following, only by way of a non-limiting example, with reference to the appended drawings, in which.

All these views present the walls as transparent to see inside the apparatus, without implying that it is really so, and the inner lines are shown discontinuous.

Figure 1:
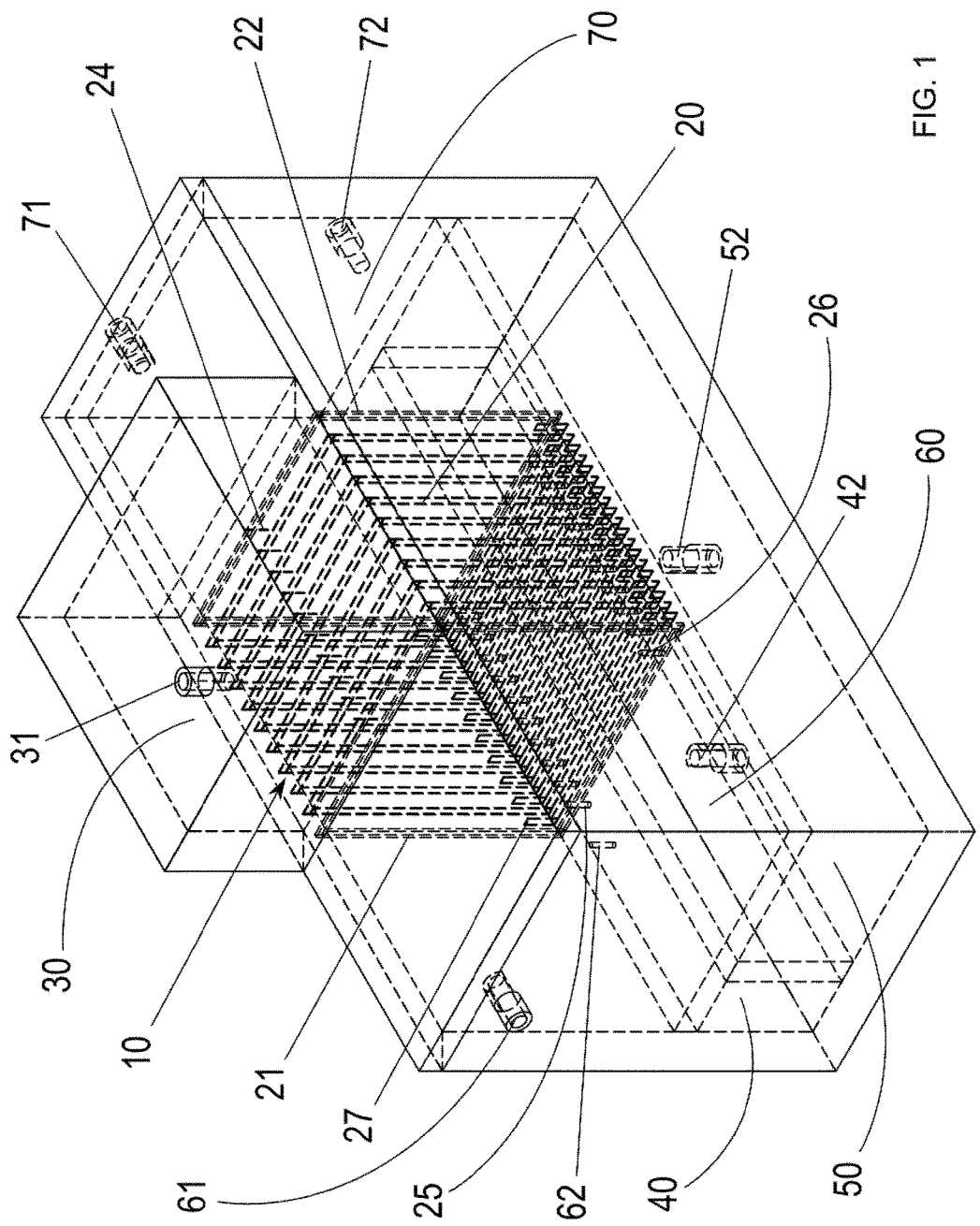
FIG. 1 is a schematic perspective view of a desalinating apparatus.
Figure 2:
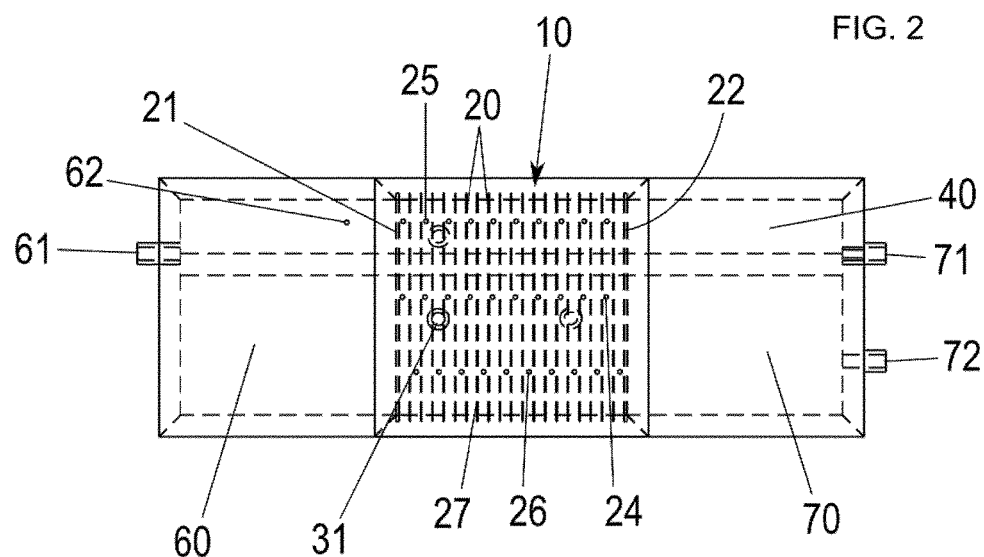
FIG. 2 is a top view of the device of FIG. 1.
Figure 3:
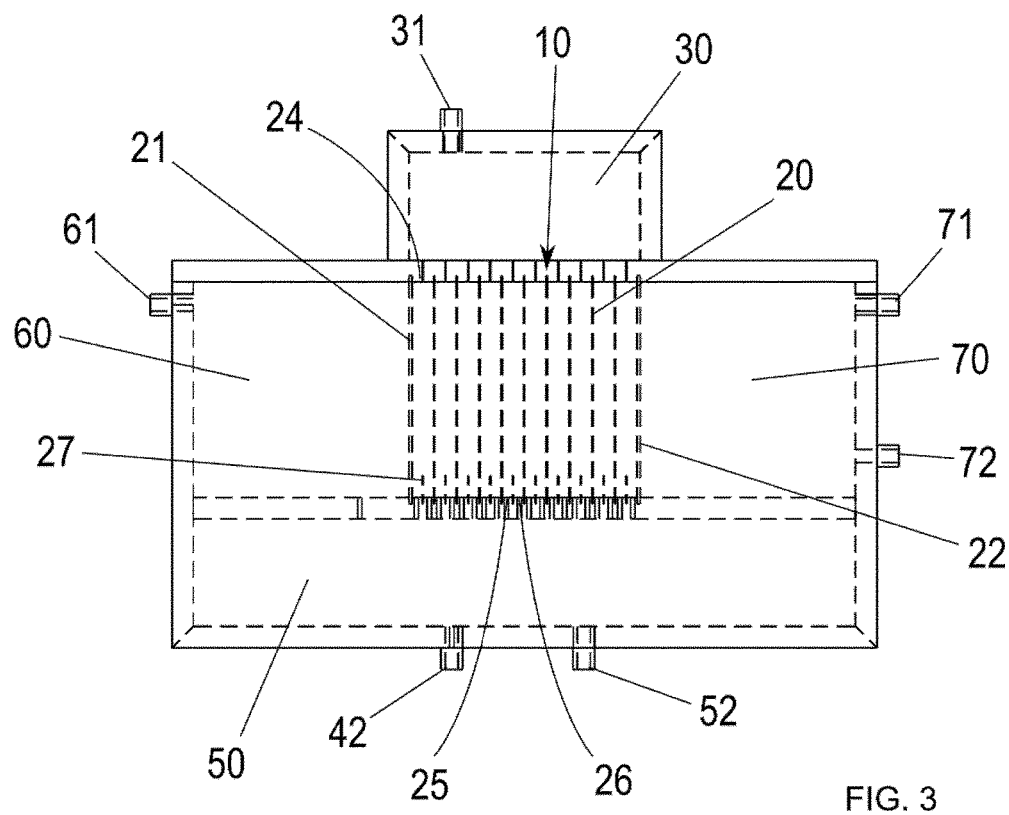
FIG. 3 is a front view of the device of FIG. 1.

The following description is made with reference to FIGS. 1 to 3.

An apparatus for desalinating seawater comprises a plurality of vertical parallel plates 20. The plates are heat-conductors and preferably metallic.

Every two consecutive plates form a chamber that is closed except in that it comprises an inlet 24, an exit 25 and an outlet 26. The inlet is located at the top of the chamber, and the exit and the outlet are located at the bottom of the chamber; the exit is intended for brine and the outlet is intended for freshwater. A short partition 27 separates the exit 25 and the outlet 26 at the bottom of the chamber in order for brine and freshwater not to get mixed. All the inlets 24 are connected to a common source of deaerated seawater, for example to a tank 30 located over the evaporation chambers. The exits 25 are connected to brine processing means, for example to a tank 40 located under the evaporation chambers, and the outlets 26 are connected to freshwater distributing means, for example to a tank 50 located under the evaporation chambers.

The tank 30 is provided with an inlet 31 connected to the common source of deaerated seawater. The brine tank 40 is provided with an outlet 42 and the freshwater tank 50 is provided with an outlet 52.

The set of evaporation chambers form a desalinating device 10 that is a part of the apparatus. The device 10 comprises two end-plates 21 and 22. The end-plate 21 is in thermal contact with a hot source (heating agent), for example a flow of relatively warm raw seawater ("raw seawater" meaning not deaerated seawater), and the end-plate 22 is in thermal contact with a cold sink (cooling agent), for example a flow of relatively cold raw seawater. The end-plates are thicker than the inner plates because they have to stand bigger pressure differentials, as the evaporation chambers operate at a subatmospheric pressure.

In case the heating agent is a flow of a fluid, the apparatus comprises a cistern 60 provided with an inlet 61 connected to a source of said fluid and an outlet 62 connected, for example, to the brine tank 40, which is especially interesting when the fluid is seawater because the latter then dilutes the brine. In case the cooling agent is a flow of a fluid, the apparatus comprises a cistern 70 provided with an inlet 71 connected to a source of said fluid and an outlet 72 connected wherever suitable.

There is thus a certain vacuum in each evaporation chamber and, since the incoming seawater has been previously deaerated, the heat-exchanging agent in each chamber is water vapour. In operation, the plates and the evaporation chambers are hotter as they are nearer the heating agent and colder as they are nearer the cooling agent. In the drawings, the left-hand plate of each evaporation chamber is the hot one and the right-hand plate is the cold one.

In each evaporation chamber, the hot plate is provided with a hydrophilic coating and the cold plate is provided with a hydrophobic coating. Therefore, each inner plate 20 is provided with a hydrophobic coating on its left side (condensation surface) and with a hydrophilic coating on its right side (evaporation surface). The end-plate 21 is provided with a hydrophilic coating on its inner side and the end-plate 22 is provided with a hydrophobic coating on its inner side.

In each evaporation chamber, the inlet 24 and the exit 25 are located next to the evaporation surface, and the outlet 26 is located next to the condensation surface. The inlet 24 (or, in general, the entrance means 24) is adapted to form a wet coating of seawater on the evaporation surface, and the hydrophilic coating further facilitates the formation of said coating. The chamber is at a subatmospheric pressure such that an important amount of said seawater can evaporate at ambient temperature. The evaporated water takes heat from the hot plate and travels in the subatmospheric and deaerated environment of the chamber to the cold plate; the not-evaporated seawater is discharged through the exit 25 as brine.

The wet coating uniformly covers the evaporation surface and is so thin that it doesn't constitute a boundary layer, as a flowing film does, the thermal impedance of which would be higher. At the same time, since most of the water in the wet coating is evaporated, most of the deaerated seawater is put to good use.

It is nevertheless convenient to supply a little more water than is evaporated to prevent salt depositions, so that there is an increase of salt concentration from approximately 3.5% to 35% (which gives the brine evacuated through the exit 25). The saturation point of salt in water at ambient temperature is about 40%, well above the intended limit of 35%, whereby precipitation is prevented.

Note that all the evaporation chambers operate simultaneously, since they are fed all at once from a common source or, in general, with deaerated seawater at a uniform temperature, and that the hot plate of one chamber is the cold plate of the previous chamber, so that the cooling of a hot plate (evaporation surface) by evaporation contributes to the condensing function of the same plate in its role as the cold plate (condensation surface) of the previous evaporation chamber.

In each evaporation chamber, the water vapour travels from the evaporation surface to the condensation surface, where it condenses. The hydrophobic coating of the condensation surface repels the condensed water, which is then collected through the outlet 26 as freshwater. The heating of the cold plate by condensation contributes to the evaporating function of the same plate in its role as the hot plate of the next evaporation chamber.

Only two conditions are required to keep this desalination process going on by itself: a difference of temperature between the heating agent and the cooling agent and the uninterrupted presence of the heat-exchanging agent in at least one evaporation chamber, e.g., the continuous presence of a wet coating of deaerated seawater on at least one evaporation surface (it is explained below, with reference to FIGS. 4 and 5, what happens when vapour generation is stopped in one chamber). Upon these conditions, the process is self-regulated.

Depending on the conditions of the apparatus the device 10 is fitted in, said device is charged with transmitting a determined thermal power which, in turn, determines the flow rate of seawater to supply to each evaporation chamber. The nearer the chamber is to the cooling agent, the bigger said flow rate should be because the evaporating seawater has to remove all the thermal energy transmitted from the previous chambers, as each chamber should transmit to the next one (through the plate they share) the thermal energy of the water evaporated in said chamber plus the thermal energy of the water evaporated in the previous chambers, otherwise, if the flow rate of water inputted to the chamber is not enough then the evaporation surface will dry up.

The number, area and thickness of the plates 20 can be adapted to the intended use of the device 10, that is, to the difference of temperature between the heating and cooling agents and to the thermal power to be transmitted.

The heat transfer inside each chamber is threefold:
evaporation: water absorbs heat from the hot plate (evaporation surface);
convection: vapour transports said thermal energy to the condensation surface;
condensation: the cold plate (condensation surface) absorbs heat from the condensing water.

This continuing process is self-regulated, both thermally (temperature difference between two consecutive chambers) and mechanically (pressure difference between two consecutive chambers). Both the temperature and the pressure in the chambers decrease in the sense from the heating to the cooling agents.

The thinner the plates 20, the smaller their thermal resistance, the smaller the temperature gradient across the thickness of each plate and the smaller the difference of pressure each plate has to withstand, so the higher the number of plates that can be fitted for a given total temperature gradient.

The phase changes are reversible and do not involve any loss of energy. With a good insulation on the device 10 the loss of heat is negligible. The temperature gradient inside any chamber is extremely low, practically non-existent.

It is important to use only deaerated seawater because the air molecules ($N_2$, $O_2$, $CO_2$, etc.) are much heavier than the water molecules ($H_2O$) and would hinder the travel of the latter in the evaporation chamber.

Figure 4:
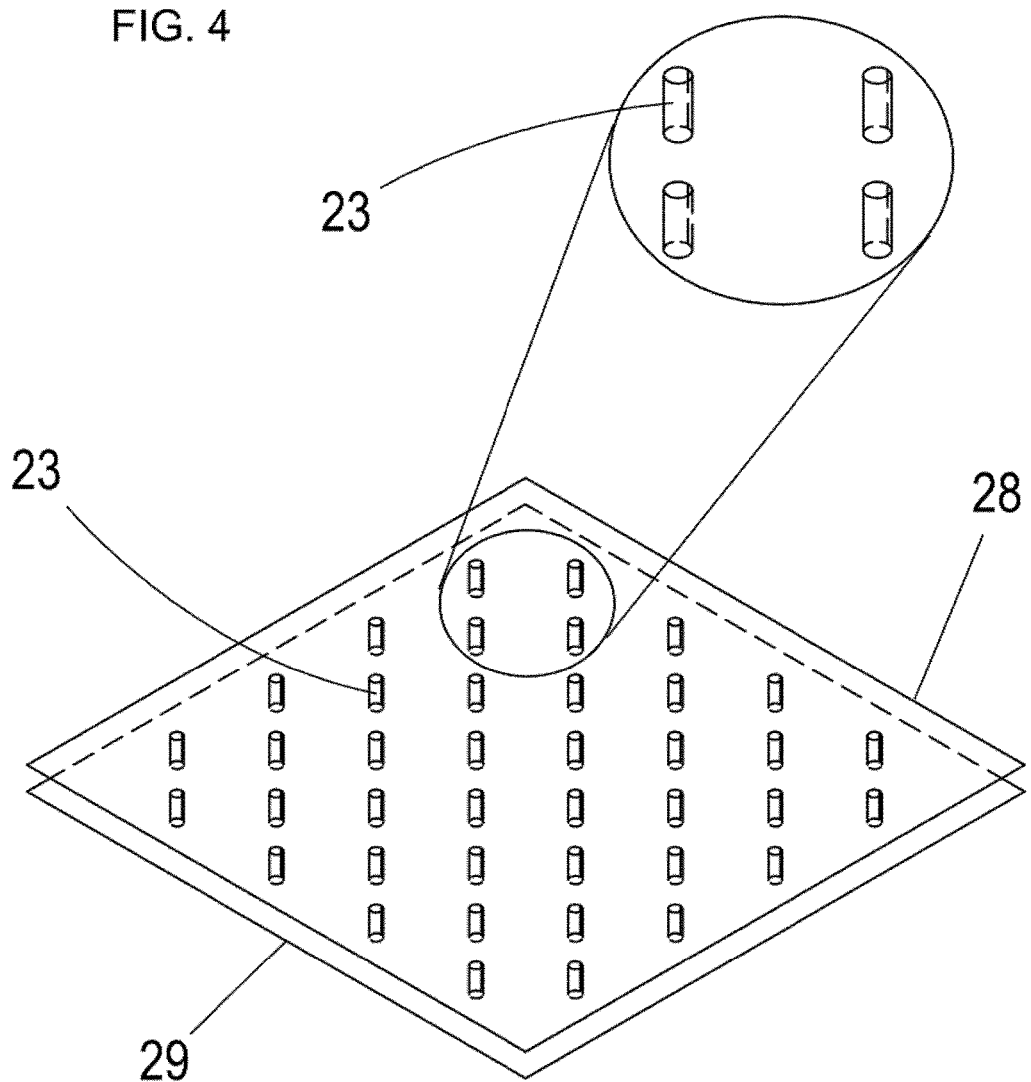
FIG. 4 is a schematic perspective view of some heat conductors arranged between two plates with an enlarged detail.
Figure 5:
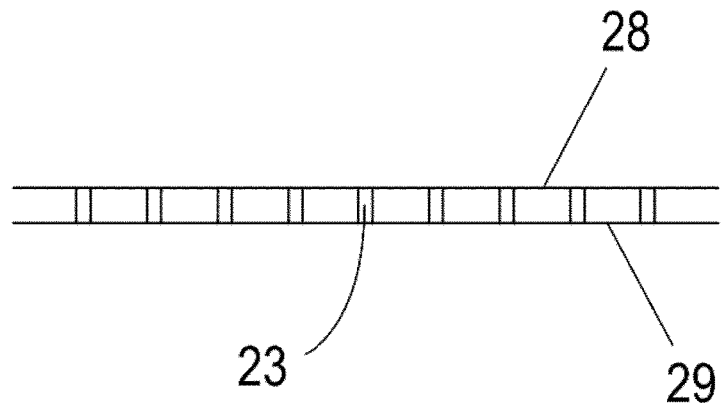
FIG. 5 is a front view of the heat conductors of FIG. 4.

The following description is made with reference to FIGS. 4 and 5.

A plurality of rods 23 thermally connect any two consecutive plates 28 and 29. The rods 23 are heat conductors and intervene in case the vapour generation is interrupted in the evaporation chamber delimited by the plates 28 and 29; should this happen, the heat-exchange between the plates 28 and 29 would continue by thermal conduction through the rods 23 (which are not shown in FIGS. 1-3).

The rods 23 thus constitute a safety element to keep:
The heat-exchange between the heating and cooling agents when, for whatever reason (such as the interruption of the supply of deaerated seawater), the vapour generation in all evaporation chambers is stopped.
The desalination process when the vapour generation in some, but not all, evaporation chambers is stopped.
The rods 23 are preferably metallic.

Although only particular embodiments of the invention have been shown and described in the present specification, the skilled man will be able to introduce modifications and substitute any technical features thereof with others that are technically equivalent, depending on the particular requirements of each case, without departing from the scope of protection defined by the appended claims.

For example, the plates could be inclined, not-parallel or not-metallic.

The invention claimed is:

1. An apparatus for desalinating seawater comprising
at least three solid plates, two of which are respective first and second end plates,
at least two evaporation chambers, each of which delimited by two consecutive plates which are respective first and second plates of each of said at least two evaporation chambers,
an entrance to feed the evaporation chambers with seawater to be desalinated, and,
a source of deaerated seawater that is connected to the entrance,
the entrance being configured to feed all the evaporation chambers with deaerated seawater from said source, and
one surface of any intermediate plate being configured to operate as a condensation surface in one chamber and the other surface being configured to operate as an evaporation surface in the next chamber,
the apparatus further comprising a heating system to heat the first end plate and a cooling system to cool the second end plate,
said heating system being configured to employ a flow of non-deaerated seawater that is external to the apparatus.

2. The apparatus of claim 1, wherein the first one of the consecutive plates of each of the at least two evaporation chambers is configured to operate as an evaporation surface in the respective one of the at least two evaporation chambers which it delimits and the second one of the consecutive plates being configured to operate as a condensation surface in the same respective one of the at least two evaporation chambers.

3. The apparatus of claim 2, wherein each evaporation chamber comprises a plurality of heat conducting rods that connect the two plates of the chamber delimited by the two plates thereof.

4. A method of desalinating seawater
using an apparatus comprising
at least three solid plates,
at least two evaporation chambers, each of which delimited by two consecutive plates, and
an entrance to feed the evaporation chambers with seawater to be desalinated, wherein the entrance is configured to feed all the evaporation chambers with seawater from a common source, and one surface of any intermediate plate is configured to operate as a condensation surface in one chamber and the other surface is configured to operate as an evaporation surface in the next chamber;

the method comprising at least:

deaerating the seawater to be desalinated, and, setting the evaporations chambers at a subatmospheric pressure that is lower than the vapour pressure of water at ambient temperature, in order to facilitate water evaporation rather than ebullition, and, feeding said deaerated seawater to all the evaporation chambers;

condensing water on a condensation surface; and, evaporating water on an evaporation surface.

5. The method of claim 4, comprising heating one of the end plates and cooling the other end plate.

6. The method of claim 5, wherein either said heating or said cooling involves a flow of seawater.

7. The method of claim 5, wherein said heating involves a flow of seawater that is external to the apparatus.

8. The method of claim 7, wherein the seawater in said flow of seawater is not deaerated.

9. The method of claim 4, wherein the deaerated seawater is fed to each evaporation chamber to form a wet coating of deaerated seawater on the evaporation surface of the chamber, said wet coating being so thin that is does not constitute a boundary layer.

10. The method of claim 4, wherein heat is conducted from at least one plate to the next plate through a plurality of heat conducting rods.

* * * * *